(12) United States Patent
Robison

(10) Patent No.: US 7,219,431 B2
(45) Date of Patent: May 22, 2007

(54) TRIMMER WITH REPLACEABLE LINE CARTRIDGE

(76) Inventor: Joseph M. Robison, 614 S. Pine, Carterville, MO (US) 64835

( * ) Notice: Subject to any disclaimer, the term of this patent is extended or adjusted under 35 U.S.C. 154(b) by 0 days.

(21) Appl. No.: 11/163,084

(22) Filed: Oct. 4, 2005

(65) Prior Publication Data
US 2007/0074403 A1    Apr. 5, 2007

(51) Int. Cl.
*B26B 27/00* (2006.01)
*A01D 34/416* (2006.01)

(52) U.S. Cl. .......................... 30/276; 30/347; 56/12.7; 242/388

(58) Field of Classification Search .................. 30/276, 30/347; 56/12.5, 12.7, 12.1; 242/18 R, 242/378, 378.4, 388, 570, 571.3, 608.4, 608.5
See application file for complete search history.

(56) References Cited

U.S. PATENT DOCUMENTS 3,928,911 A * 12/1975 Pittinger, Jr. .................. 30/276
4,091,536 A *  5/1978 Bartholomew ................ 30/276
4,118,864 A * 10/1978 Pittinger et al. .............. 30/276
4,211,004 A *  7/1980 Woods ........................ 30/276
4,642,976 A *  2/1987 Owens ........................ 56/16.9
4,707,919 A * 11/1987 Tsuchiya ..................... 30/276
6,279,235 B1 *  8/2001 White et al. .................. 30/276

* cited by examiner

*Primary Examiner*—Boyer D. Ashley
*Assistant Examiner*—Edward Landrum
(74) *Attorney, Agent, or Firm*—Hovey Williams LLP

(57) ABSTRACT

An improved line trimmer (10) for weed or grass cutting is provided which includes a operating head (16) having a rotatable housing (44) with cutting line outlet openings (68). A replaceable line cartridge (18) having a supply (118) of line (107) is mounted exteriorly of housing (44), and the free ends (120) of the line pass from the cartridge (18), through housing (44), and out the opening (68). Preferably, the cartridge (18) is mounted on an upright tubular drive shaft (42) coupled with housing (44), so that the line (107) may be threaded through the drive shaft (42).

14 Claims, 4 Drawing Sheets

TRIMMER WITH REPLACEABLE LINE CARTRIDGE

BACKGROUND OF THE INVENTION

1. Field of the Invention

The present invention is broadly concerned with string or line-type weed or grass trimmers which make use of rapidly rotating monofilament line(s) for cutting purposes. More particularly, the invention is concerned with such trimmers, methods of operating the trimmers and replaceable line cartridges used with the trimmers. The invention is especially directed to improved line trimmers configured to minimize trimmer downtime associated with line replacement.

2. Description of the Prior Art

Rotatable line trimmers have been available for years and are a staple item for many homeowners. Generally speaking, such trimmers include an elongated handle and a rotatable cutting head arrangement mounted adjacent the lower end of the handle. The cutting head typically includes a rotatable housing which has a replaceable supply of cutting line wrapped about an internal spool. The free end of the cutting line extends through an opening provided in the housing, so that upon rotation the free end becomes a fast-rotating cutting implement. The trimmers may be gasoline or electric motor operated, but usually electric motors are mounted adjacent the lower head assembly whereas gasoline motors are normally supported adjacent the upper end of the handle.

A nagging problem with such line trimmers is the need to rather frequently replace the line spool or other supply of cutting line. Such replacements can be difficult, owing to the fact that the user must disassemble the rotatable housing and either remove the old spool and replace it with another, or wind fresh line around the existing spool. In either case, the line can tend to unravel or otherwise foul during the installation process.

There is accordingly a need in the art for an improved trimmer design which minimizes trimmer downtime owing to line replacements, while also simplifying the procedures required during line replacements.

SUMMARY OF THE INVENTION

The present invention overcomes the problems outlined above and, according to one aspect thereof, provides a line trimmer having a housing that presents a line outlet. The trimmer further includes a power source operably coupled with the housing for rotation thereof. The improvement comprises a supply of line located exteriorly of the housing, with line from the supply extending into the housing and out of the line outlet.

According to another aspect of the present invention, a line trimmer includes a trimmer head having a rotatable housing. The housing presents at least one line outlet and an internal line support. The trimmer also includes a power source drivingly interconnected with said housing for rotation thereof. Yet further, the trimmer includes a line cartridge adapted to hold a supply of line. The line cartridge is located exteriorly of the housing, there being a line passageway between the cartridge and the housing allowing passage of line from the cartridge and into the housing, with the line engaging the line support and a section thereof extending through the line outlet to be rotated with the housing.

In preferred forms, the trimmer head includes an upright, tubular drive shaft operably connected with the housing for rotation thereof. This drive shaft also supports a replaceable can-type cartridge holding a supply of cutting line. The end of the line passes downwardly through the drive shaft and into the housing to engage the internal housing support (preferably in the form of a rotatable spool); ultimately, the free end of the line extends through the housing outlets. If desired, a plurality of lines may be employed for increased cutting efficiency.

A further aspect of the present invention concerns a method of operating a line trimmer. The trimmer includes a power source and a housing presenting a line outlet. The power source is operably coupled with the housing for rotation thereof. Moreover, the method includes the steps of providing a supply of line at a location exteriorly of the housing, and passing the line from the supply into the housing and out of the line outlet. The method also includes the step of operating the power source to rotate the housing and the line extending from the line outlet while maintaining the line supply in the location thereof.

Another aspect of the present invention concerns a cartridge for use with a line trimmer. The cartridge comprises a hollow body presenting an end wall, a sidewall, and an open outlet mouth. The cartridge includes a continuous supply of monofilament line within the body and having a free end thereof adapted to extend through the outlet mouth. The line is of suitable weight and durability for the cutting of weeds or grass. The supply is oriented to permit successive lengths of the line to be dispensed through the mouth. The cartridge also includes connection structure associated with the body for permitting detachable connection of the cartridge to the line trimmer with the free end oriented for weed or grass cutting.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

Figure 1:
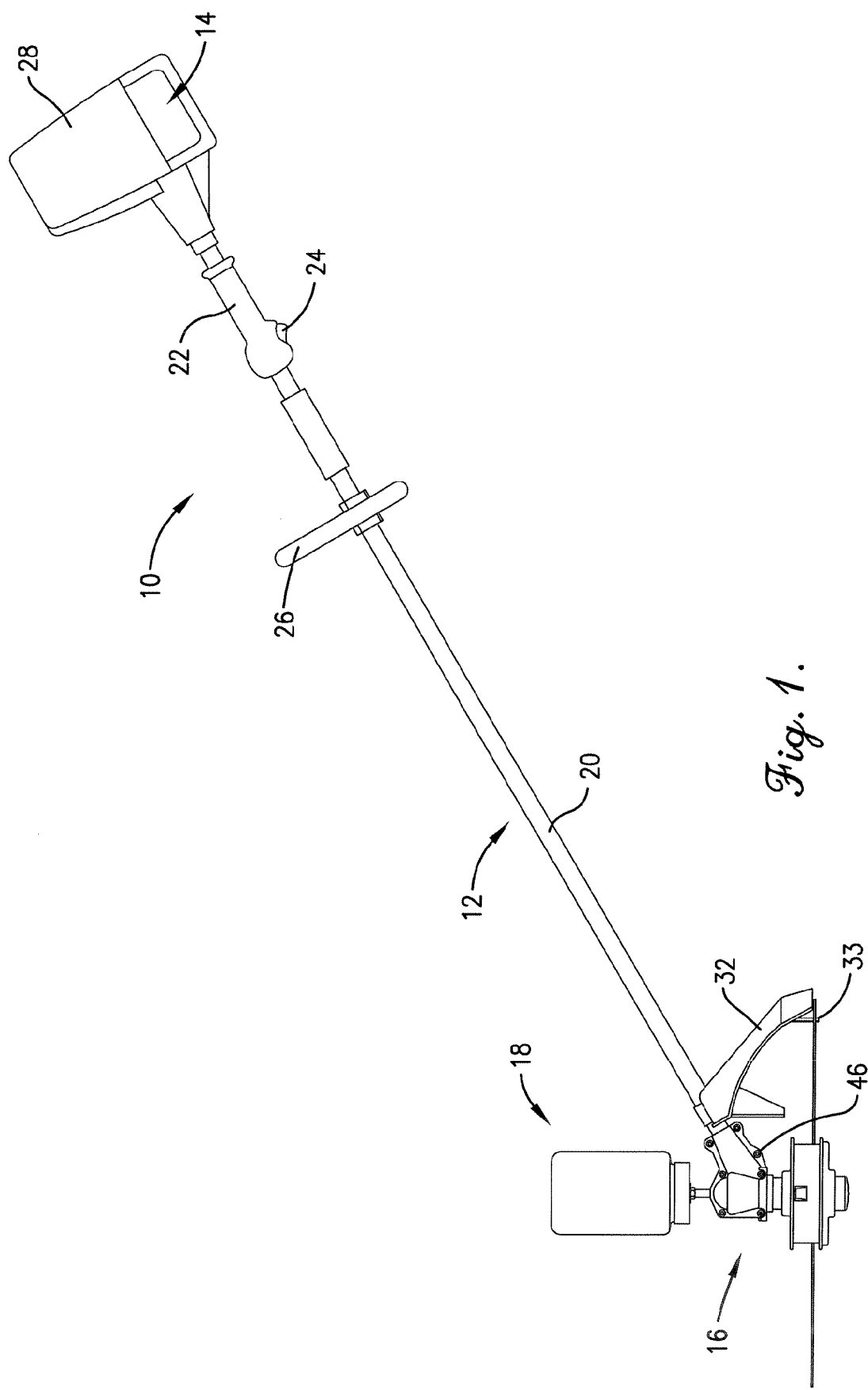
FIG. 1 is an elevation view of a preferred line trimmer in accordance with the invention.
Figure 2:
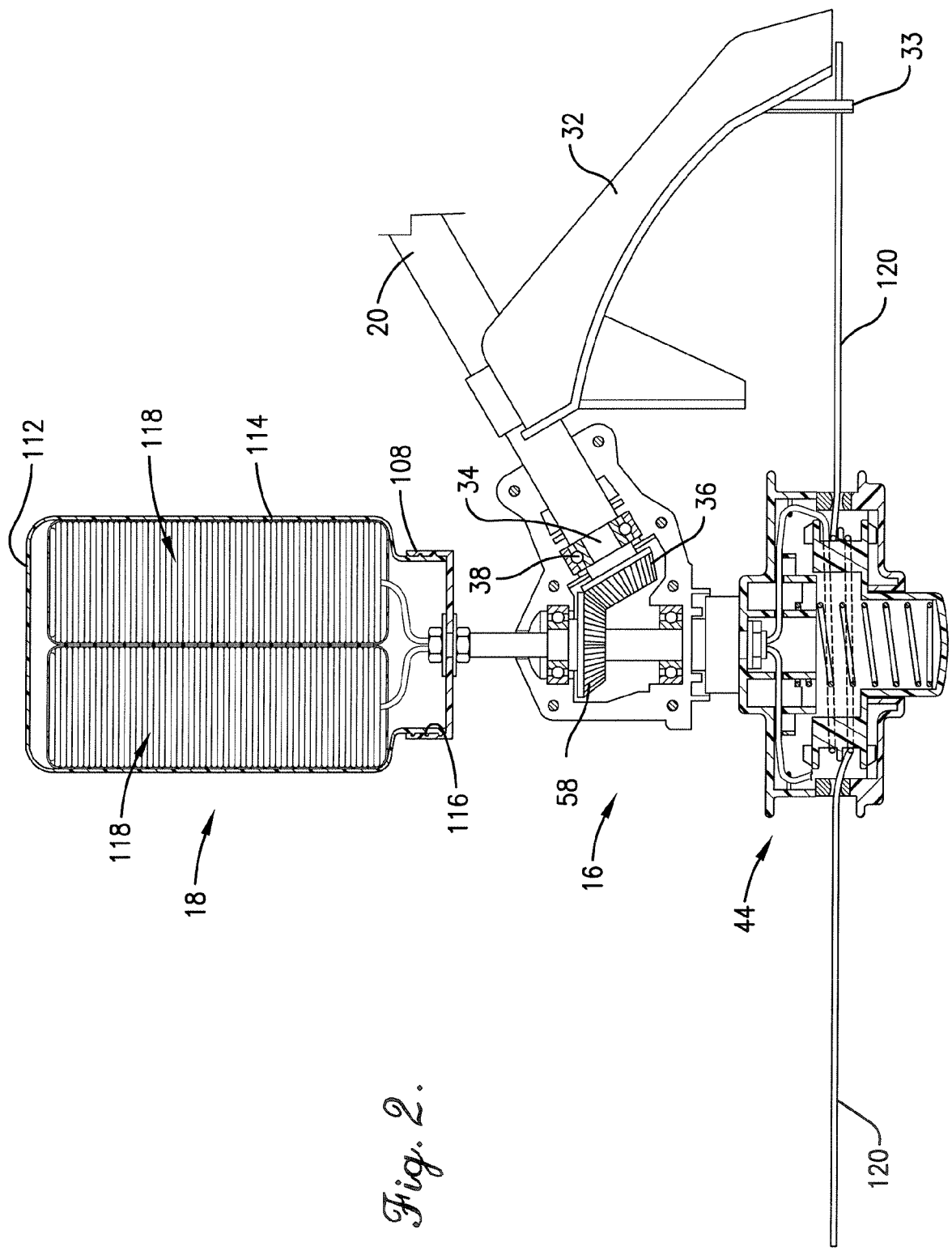
FIG. 2 is a fragmentary view in partial vertical section of the line trimmer of FIG. 1, and showing the trimmer in its normal operating position for weed or grass trimming.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENT

Turning now to the drawings, a string or monofilament line trimmer 10 is illustrated in FIG. 1. The line trimmer 10 broadly includes an elongated handle 12 supporting a conventional gasoline-powered engine 14 adjacent the upper end thereof and an operating head 16 at the opposed lower end. A separate line cartridge 18 is also supported by head 16. The trimmer 10 is operable for cutting weeds and grass in the well-known manner.

In more detail, the handle 12 is in the form of an elongated, tubular body 20 supporting an upper hand grip 22 equipped with operating trigger 24, as well as a supplemental loop-type hand grip 26 spaced below grip 22. An engine housing 28 is located at the uppermost end of handle 12 and encloses the engine 14. An arcuate guard 32 is secured to body 20 adjacent the lower end thereof, proximal to head 16. A vertically extending cutter blade 33 depends from one end of the guard 32. An elongated drive shaft 34 extends within and along the length of the body 20. The shaft 34 is operatively connected to engine 14 and has a lower bevel gear 36. The shaft 34 is supported for axial rotation by means of bearings 38 spaced along the length thereof. It is entirely within the ambit of the present invention to utilize other handle configurations. For example, the handle alternatively be sectioned so that alternative heads can be used with the engine 14. The handle could also use alternatively shaped and configured grips and guards.

The engine 14 is preferably in the form of a two-cycle engine, although other suitable power sources may be provided. For example, the trimmer could alternatively be electrically powered and thereby provided with an electric motor. Furthermore, the principles of the present invention are equally applicable to other locations of the power source. For example, some electrically powered trimmers have the motor located adjacent the head of the trimmer (i.e., at the lower end of the handle).

The illustrated operating head 16 generally includes a stationary, two-part, interconnected drive housing or fixture 40, an elongated, upright, tubular drive shaft 42 extending through fixture 40, and a lowermost housing 44. The fixture 40 includes an obliquely upwardly extending segment 46 which receives the lower end of shaft 34, as well as lower bearings 38 and bevel gear 36. Additionally, the fixture has a primary segment 48 equipped with upper and lower bearings 50,52 which rotatably support drive shaft 42. Finally, the fixture 40 includes a short, tubular, downwardly extending transition segment 54.

The drive shaft 42 extends through the primary fixture segment 48, and particularly through an upper opening 56 and out of transition segment 54. A bevel gear 58 is secured to shaft 42 and is in meshed, driving engagement with bevel gear 36.

The housing 44 includes upper and lower, detachably interconnected annular components 60,62 which cooperatively define an interior space 64. The lower component 62 has a pair of circumferentially spaced apart, opposed, upstanding tabs 66, each defining a line outlet opening 68. In addition, the lower component 62 has a bottom wall 69 and an inboard upstanding annular wall 70 defining a central opening 72. The bottom wall 69 has a series of internal, upstanding, radially extending, spaced apart ribs 73. The upper component 60 includes an apertured top wall 74 as well as depending, outboard annular wall 76 which mates with lower component 62. Also, the top wall 74 has an innermost, downwardly extending annular wall 78 with a pair of opposed line openings 80 formed therein, and an intermediate annular wall 82 likewise with opposed line openings 84. A series of radial, inwardly extending strengthening ribs 86 are provided which are integral with top wall 74 and are notched as at 88. Finally, a pair of line guides 87 are located adjacent wall 74 for purposes to be described.

Although not shown in detail, those of ordinary skill in the art will appreciate that the components 60 and 62 are detachably interconnected by a conventional and customary arrangement. In particular, a pair of flexible latches (not shown) are provided on the lower component 62 to releasably engage catches (also not shown) on the upper component 60. The locking interengagement between the latches and catches serves to interconnect the components 60 and 62, with the latches being manually and simultaneously flexed out of engagement with the catches to permit disconnection of the components (of course, the upper component remains on the shaft 42). Other suitable connections (e.g., threaded connection) may be provided between the components 60 and 62.

A rotatable spool 90 is located within housing space 64 and has an annular main body 92 equipped with upper and lower flanges 94,96. In addition, the spool 90 has a central, depending cavity section 98 which extends through opening 72 and terminates in a bottom wall 100 located below lower housing component 62. The lower flange 96 carries a series of drive lugs 102 which are adapted to mate with ribs 73*a* in a manner to be described. A biasing spring 104 is situated within section 98, engaging bottom wall 100. The upper end of spring 104 fits within rib notches 88.

The entire housing 44 is mounted for axial rotation through the medium of drive shaft 42. To this end, the lower end of shaft 42 is secured to top wall 74 by means of connectors 106.

The line cartridge 18 is designed to afford a continuous supply of cutting line 107 to head 16, and to minimize instances where the operation of trimmer 10 must be interrupted for reloading with cutting line. In detail, the upper end of drive shaft 42 is equipped with a somewhat cup-shaped, internally threaded support 108. The support 108 is secured to the shaft 42 by means of annular couplers 110.

The cartridge itself is in the form of a metallic or synthetic resin body 111 having a top wall 112, annular side wall 114, and an externally threaded outlet 116 to mate with support 108. It is entirely within the ambit of the present invention to locate the cartridge in another position on the trimmer and provide alternative means for removably installing the cartridge. That is to say, the principles of the present invention contemplate attachment of the cartridge to trimmer components other than the head (e.g., the cartridge can alternatively be placed adjacent the engine housing 28 with line extending through the handle 12 to the head 16). Furthermore, the cartridge can be removably connected by means other than a threaded connection (e.g., the cartridge can be snap fit onto the support 108 and releasably locked in place by a suitable locking pin). Returning to the illustrated embodiment, the cartridge contains a pair of spools 118 of line 107, each line having a free end 120 which passes through head 16. Alternatively, the cartridge may be provided with only a single spool, the free ends thereof extending through the head. It is noted that the illustrated embodiment depicts two free ends 120 and corresponding line sections extending from the housing; however, the principles of the present invention are equally applicable to a head arranged for use with more or less line sections. In either alternative, the number of free ends of line (and, most preferably, the number of line spools) provided by the cartridge is equal in number to the number of line sections projecting from the housing. Although not shown, it will be appreciated that the cartridge is provided with a removable cover (e.g., a threaded cap, a film releasably adhered to the outlet 116, etc.) to retain the line therein until the cartridge is attached to the support 108.

In use, the free ends 120 from cartridge 18 are first threaded downwardly through drive shaft 42 and into the confines of housing 44, having the components 60,62 thereof detached. At this point, the ends 120 are threaded through the line guides 87 of upper component 60 and thence are wrapped for at least one turn around the main body 92 of spool 90. The free ends are then extended through the line outlets 64 of the housing. Next, the cartridge 18 is threaded into support 108 and the housing components 60,62 are reattached. The trimmer 10 is then ready for use.

During weed or grass cutting with trimmer 10, the engine 14 is started and the user grips hand grips 22,26 to pull the trimmer in a cutting orientation. The user then depresses trigger 24 which serves to transmit power from engine 14 along shaft 34 in order to rotate drive shaft 42. This in turn serves to rapidly rotate housing 44 with the effect that the free ends 120 rotate for cutting. During this operation, the spool 90 rotates in unison with housing 44, because of the bias of spring 104, serving to urge the drive lugs 102 into interengagement with ribs 73. Any excess length of the ends 120 is removed by virtue of cutter 33, so that the lines present cutting line sections having the desired length consistent with the location of guard 32.

Figure 3:
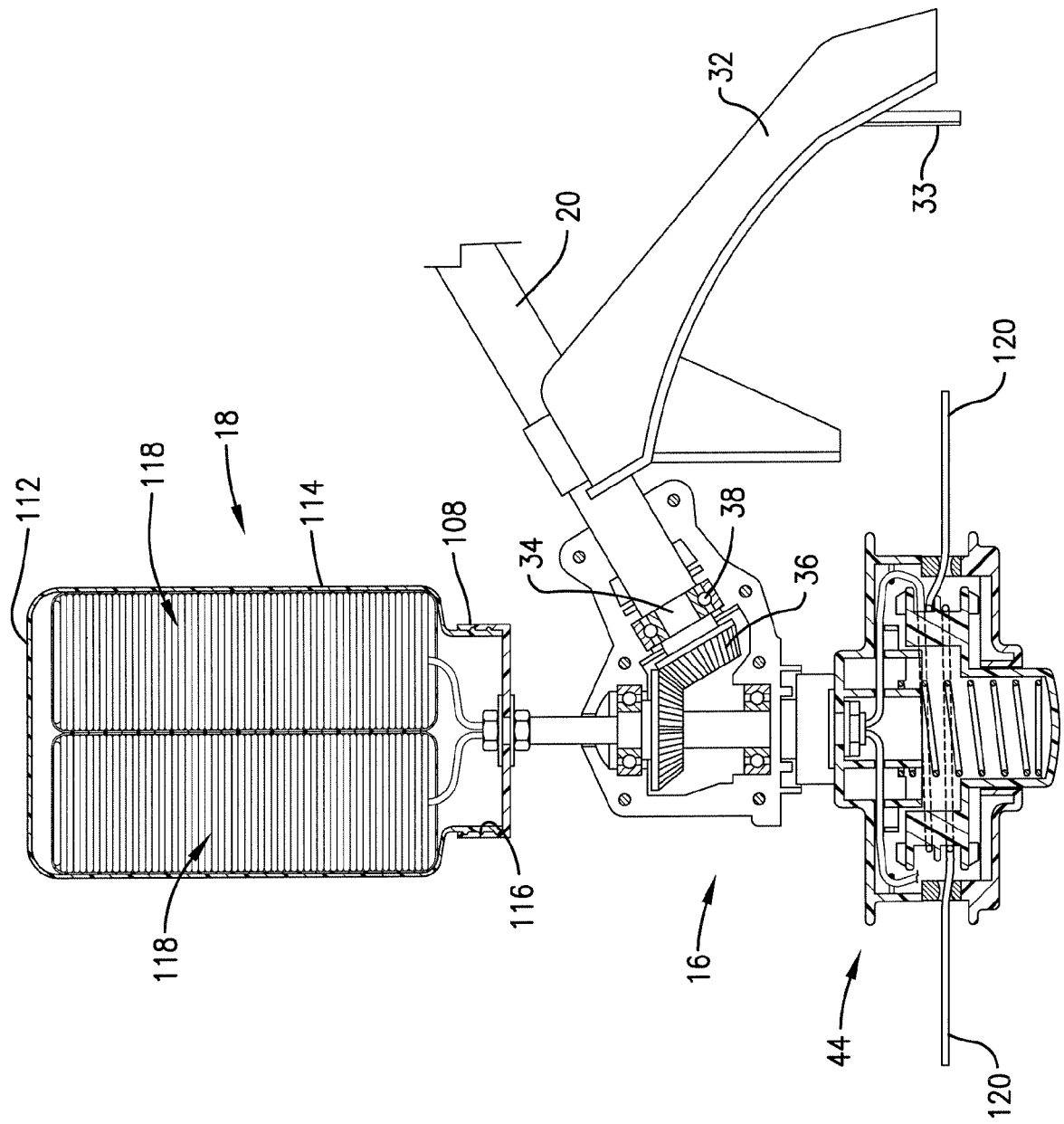
FIG. 3 is a view similar to that of FIG. 2, but illustrating the trimmer in its line-feed operation to replenish the lengths of line extending from the housing.
Figure 4:
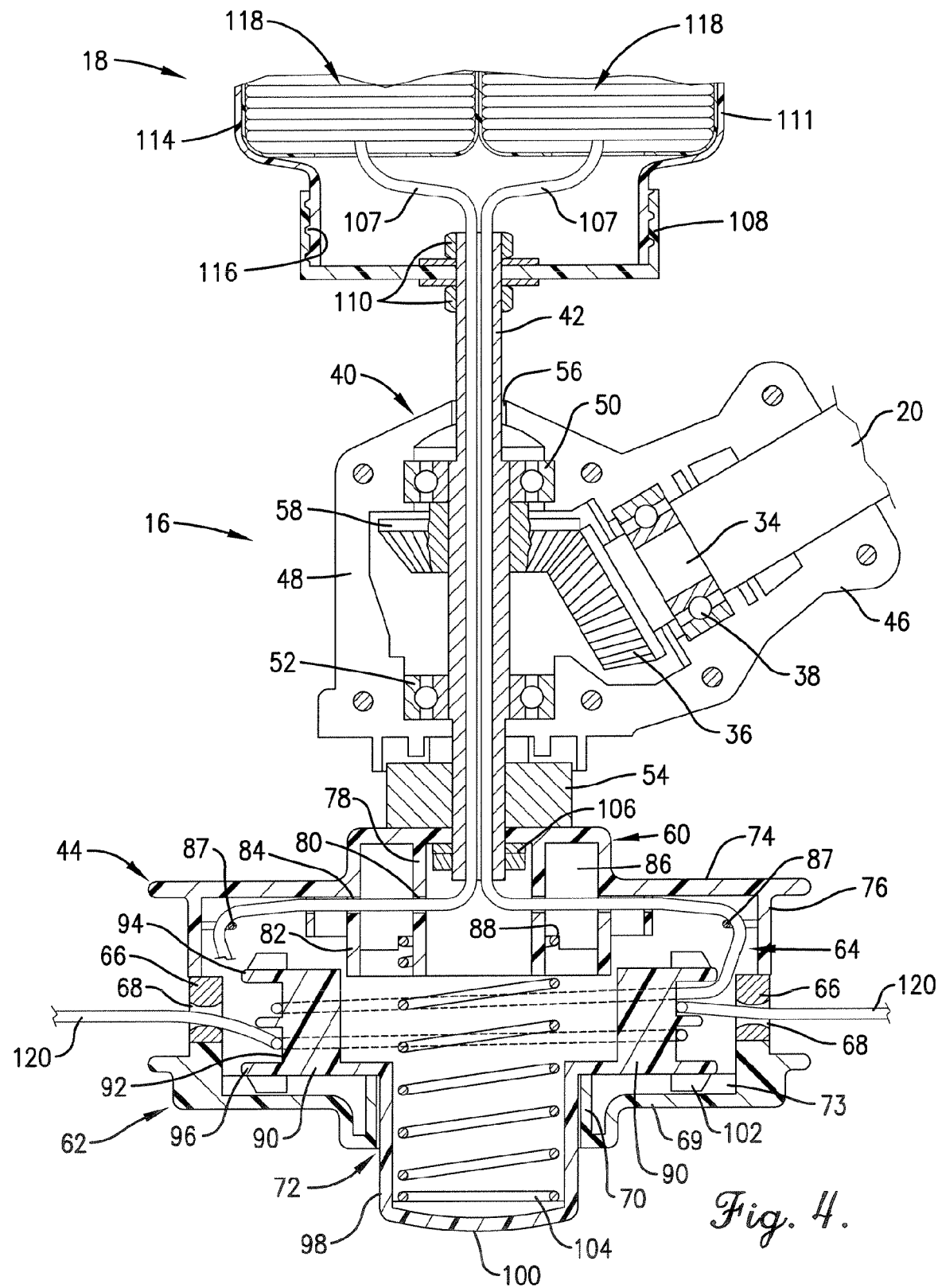
FIG. 4 is an enlarged, fragmentary vertical sectional view depicting the details of construction of the preferred line trimmer head and detachable line cartridge.

As cutting proceeds, the line sections (ends 120) extending from housing 44 progressively become shorter and cutting efficiency decreases (see FIG. 3). In order to increase the free end length, the user merely taps the bottom wall 100 against the ground. This serves to slightly elevate spool 90 (against the bias of spring 104) so that the lugs 102 are temporarily moved out of engagement with ribs 73. This permits relative rotation between the spool 90 and the housing 44, with the effect that the free ends 120 move outwardly under the influence of centrifugal force to their design lengths as dictated by cutter blade 33. Of course, this serves to draw line from the spools 118 within cartridge 18. Although the illustrated head 16 is depicted with a relatively standard line-dispensing arrangement, other suitable dispensing configurations are within the ambit of the present invention. For example, the dispensing head may be provided with other conventional dispensing arrangements or the line may be dispensed from an unconventional arrangement (e.g., a trigger-controlled dispenser located remote from the head).

The use of a cartridge 18 mounted exteriorly of housing 44 permits long-term use of trimmer 10 without the necessity of interrupting cutting operations for line reloading. When the supply of line within cartridge 18 is exhausted, however, it is necessary to replace the cartridge 18 with a fully loaded cartridge as described above.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A line trimmer, comprising:

a trimmer head including a rotatable housing presenting at least one line outlet, said housing including an internal line support;

a power source drivingly interconnected with said housing for rotation thereof; and a self-contained line cartridge being pre-filled with a supply of line and removably attached to the housing so as to be replaceable once the supply of line is exhausted, said self-contained line cartridge being located exteriorly of said housing so as to be exposed and readily removable, there being a line passageway between said cartridge and said housing allowing passage of line from the cartridge and into the housing, with the line engaging said line support and a section thereof extending through said line outlet to be rotated with the housing, said self-contained line cartridge presenting a line-receiving chamber in which the supply of line is contained and a line-receiving opening through which line is fed from the chamber, said opening presenting a smaller width dimension than the chamber so that the supply of line is retained within the chamber prior to cartridge attachment, said self-contained line cartridge including a sidewall that presents opposite first and second ends and an endwall that spans the first end and thereby encloses a corresponding end of the line receiving chamber, said sidewall including a main body portion that cooperates with the endwall to define the line-receiving chamber, said sidewall including a neck portion projecting axially from the main body portion to define the second end, said neck portion having a reduced cross-sectional dimension relative to the main body portion so as to define the line-receiving opening, said head including a cartridge support fixed relative to the rotatable housing, said neck portion being releasably attached to the cartridge support, with the cartridge support being positioned to overlie the line-receiving opening, said rotatable housing and cartridge being interconnected by the cartridge support so as to rotate with one another.

2. The line trimmer as claimed in claim 1, said head including a fixture supporting an elongated drive shaft, said housing being fixed relative to said drive shaft, said power source being operably coupled with said drive shaft for rotation thereof.

3. The line trimmer as claimed in claim 2, said housing being fixed to the drive shaft adjacent one end thereof, said drive shaft supporting said cartridge at the end thereof remote from said housing.

4. The line trimmer as claimed in claim 2, said drive shaft being tubular and at least in part defining said line passageway.

5. The line trimmer as claimed in claim 1, said power source comprising a gasoline-powered engine.

6. The line trimmer as claimed in claim 5;

an elongated handle operably coupled with said head, said power source being mounted on said handle at a position spaced from said head; and a drive line extending along the length of said handle between said power source and said head.

7. The line trimmer as claimed in claim 1, said cartridge adapted to receive a coil of said line therein with the free end of the coil extending outwardly from the cartridge and through said passageway.

8. The line trimmer as claimed in claim 1,
said housing comprising a pair of detachably interconnected components, said line outlet being formed in one of said components.

9. The line trimmer as claimed in claim 8,
said line support comprising a rotatable spool shiftable between a first position in engagement with one of said components for rotation together of the one component and spool, and a second position separated from the one component for permitting relative rotation between the one component and spool.

10. The line trimmer as claimed in claim 9,
said housing including a spring that yieldably biases the spool to said first position thereof.

11. The line trimmer as claimed in claim 1,
said supply of line forming a coil within the line-receiving chamber,
said sidewall presenting an internal surface that defines the width dimension of the line-receiving chamber,
said coil contacting the interior surface at diametrically opposite locations thereof so that the coil presents a width dimension greater than that of the line-receiving opening.

12. The line trimmer as claimed in claim 1,
said line-receiving opening being the only opening presented by the cartridge that communicates with the line-receiving chamber.

13. The line trimmer as claimed in claim 1,
said cartridge support being cup-shaped, with the neck portion being at least partly received within the cartridge support.

14. The line trimmer as claimed in claim 13,
said neck portion and said cartridge support being attached to one another by a threaded connection therebetween.

* * * * *